United States Patent [19]

Willard

[11] Patent Number: 4,951,307

[45] Date of Patent: Aug. 21, 1990

[54] METHOD AND APPARATUS FOR RECORDING TELEPHONE MESSAGES

[76] Inventor: Dan E. Willard, 55 Blessing Road, Slingerlands, N.Y. 12159

[21] Appl. No.: 379,640

[22] Filed: Jul. 13, 1989

[51] Int. Cl.[5] .............................................. H04M 1/65
[52] U.S. Cl. ...................................... 379/74; 379/77; 379/80
[58] Field of Search ........................ 379/74, 76, 77, 80

[56] References Cited

U.S. PATENT DOCUMENTS

| | | |
|---|---|---|
| 4,345,113 | 8/1982 | Shelley . |
| 4,387,272 | 6/1983 | Castro et al. . |
| 4,515,995 | 5/1985 | Bolick, Jr. et al. . |
| 4,517,410 | 5/1985 | Williams et al. . |
| 4,588,857 | 5/1986 | Arsem . |
| 4,591,664 | 5/1986 | Freeman . |
| 4,654,485 | 3/1987 | Yamamoto . |
| 4,747,126 | 5/1988 | Hood et al. . |

Primary Examiner—Stuart S. Levy
Assistant Examiner—James E. Tomassini
Attorney, Agent, or Firm—R. Neil Sudol; Henry D. Coleman

[57] ABSTRACT

A method for recording incoming message signals on a telephone answering machine includes the step of generating a first instruction message on an outgoing telephone line to indicate to a party calling from a touch tone telephone a first signaling protocol for selecting which of the plurality of individuals is to receive a message from the calling party. In a subsequent step, the incoming telephone line is monitored for an incoming touch tone signal transmitted by the calling party in response to the first instruction message. In the event that a touch tone signal is received from the calling party in response to the first instruction message within a predetermined period of time from the beginning of transmission of the first instruction message, the received touch tone signal is decoded to determine the identity of a called individual to receive an incoming message signal from the calling party. In the event that a touch tone signal is not received from the calling party in response to the first instruction message within the predetermined period of time from the beginning of transmission of the first instruction message, a second instruction message is generated on the outgoing telephone line to indicate to a party calling from a rotary dial telephone a second aignaling protocol for selecting which of the plurality of individuals is to receive a message from the calling party. The incoming telephone line is then monitored for an incoming voice-frequency signal transmitted from the calling party in response to the second instruction message. Finally, at least one of a plurality of message tape units included in the answering telephone machine, selected in accordance with a signal transmitted by the calling party in response to the first signaling protocol or the second signaling protocol, is activated to implement the recording of an incoming message signal from the calling party on the selected message tape unit.

34 Claims, 2 Drawing Sheets

METHOD AND APPARATUS FOR RECORDING TELEPHONE MESSAGES

BACKGROUND OF THE INVENTION

This invention generally relates to a method and an associated apparatus for recording incoming electrical signals encoding telephone messages. More particularly, this invention relates to a telephone answering machine and a corresponding method of operating the machine for use by a plurality of individuals.

Conventional telephone answering machines generally include a first tape recording unit for storing an outgoing message, a second tape recording unit for recording messages arriving over an incoming telephone line, and a microprocessor for controlling the operation of the various commponents of the answering machine. A problem arises when such a conventional telephone answering machine is in simultaneous use by a plurality of individuals. If one such person plays back the incoming message tape, he or she frequently hears one or more messages meant for another individual. The person who has played back the recorded messages must then make a note of the messages intended for the other individual or individuals. Otherwise, the messages will be lost.

Systems have been devised for addressing this problem. Most of the proposed solutions involve the utilization of the same standard hardware, namely, a single incoming message tape unit and a single outgoing message tape unit. Such solutions are set forth in U.S Pat. No. 4,747,126 to Hood et al., U.S Pat. No. 4,654,485 to Yamamoto, U.S Pat. No. 4,591,664 to Freeman, and U.S Pat. No. 4,517,410 to Williams et al.

U.S Pat. No. 4,747,126 to Hood et al. is directed to a magnetic tape-based multi-user message system. The system includes a single magnetic recording tape divided into a plurality of message cells. The system further includes means for detecting an incoming call and activating the system to record a message. A decoder decodes incoming control signals, including mailbox identifiers. A processor controls the operation of the system, while the cell locations of messages on the magnetic recording tape are stored in a memory unit. The system also includes indicators for alerting users to the presence of a phone message.

U.S Pat. No. 4,654,485 to Yamamoto discloses a remote control system for a telephone answering device which incorporates a single recording tape. The tape is wound and rewound to play messages at predetermined locations in response to incoming remote control signals.

U.S Pat. No. 4,591,664 to Freeman relates to a multichannel interactive telephone apparatus which comprises a multitrack audio tape and multiple recording and playback heads for accessing the tape.

U.S Pat. No. 4,517,410 to Williams et al. discloses a telephone message recording and playback system including a single message tape divided into a plurality of message areas identified by respective three-digit touch-tone identifier codes. A controller monitors incoming calls to detect touch-tone signals from a user and automatically operates a recorder unit to drive the message tape to a user chosen position represented by the touch-tone signals and to play the message recorded at that position.

Another solution to the afore-mentioned problem is disclosed in U.S Pat. No. 4,515,995 to Bolick, Jr. et al. That patent is directed to a telephone answering machine connected to a plurality of incoming trunk lines for receiving and storing messages arriving over the trunk lines and for playing back over the trunk lines respective prerecorded messages. The answering machine comprises a single electronic recording and playback mechanism and a plurality of message tapes each separately accessed by the recording and playback mechanism in accordance with the identity of a trunk line on which an incoming call is detected.

The machine disclosed in Bolick, Jr. et al. requires a complex cassette conveyance device with a host of moving parts. Such a mechanism is prone to mechanical malfunction and would be difficult to repair. Because of the production of specialized parts, rather than the use of off-the-shelf components, manufacture would be relatively expensive.

A related problem is addressed by U.S Pat. No. 4,588,857 to Arsem. That patent shows and describes a remote control dictation system having a primary recorder which records incoming messages in seriatim. Each incoming message is accompanied by a code identifying a respective one of a plurality of secondary recorders. The individual messages are transferred from the primary recorder to the secondary recorders by a code reader and decision transfer unit in accordance with the identifying codes.

The system dislosed by Arsem is complicated and burdensome, particularly insofar as it requires the provision of several separate tape recorders inteconnected by a cable network.

Other patents disclosing telephone answering machines wherein the operation of the machine is controlled or modified in accordance with signals from remote callng stations include U.S. Pat. No. 4,387,272 to Castro et al. and U.S Pat. No. 4,345,113 to Shelley.

U.S. Pat. No. 4,387,272 to Castro et al. concerns a method and apparatus for controlling a subscriber telephone system including at least one automatic answering machine. In accordance with a code transmitted to the subscriber telephone system by a caller, either the answering machine is turned on or an acoustic signal source alerts the subscriber (the called party) to the incoming call. Castro et al. also discloses a telephone system including a plurality of secondary answering machines connected to a primary answering machine. The primary machine forwards incoming messages to the secondary machines.

U.S Pat. No. 4,345,113 to Shelley similarly relates to an apparatus wherein a telephone answering machine is connected to the incoming telephone line or not, depending on the detection of a code signal on the telephone line.

It is to be noted that none of the afore-discussed patents discloses or suggests a telephone answering machine which is capable of detecting rotary dialed signals. Similarly, no telephone answering machine capable of detecting rotary dialed signals has appeared on the market to date. Accordingly, although many solutions have been presented for routing incoming telephone message signals in accordance with incoming touch tone signals, no telephone answering machine is currently available which is able to control the routing of incoming messages in accordance with a previous signal from a rotary dial phone.

OBJECTS OF THE INVENTION

An object of the present invention is to provide an improved method and an associated apparatus for recording messages arriving over an incoming telephone line.

Another, more particular, object of the present invention is to provide such a method and apparatus for recording messages intended for different individuals, so that an individual need not hear messages intended for other parties when listening to his or her own messages.

Another object of the present invention is to provide such an apparatus which is "user friendly."

Another particular object of the present invention is to provide such an apparatus or telephone answering machine which is a relatively cost effective.

Yet another object of the present invention is to provide a telephone answering machine responsive to instructions transmitted from a rotary dial telephone.

SUMMARY OF THE INVENTION

A method for recording incoming message signals for one or more individuals of a plurality of individuals comprises the steps of (a) detecting a telephone call arriving over an incoming telephone line, (b) establishing a connection with the telephone line, and (c) generating a first instruction message on an outgoing telephone line to indicate to a party calling from a touch tone telephone a first signaling protocol for selecting which of the plurality of individuals is to receive a message from the calling party. In a subsequent step, the incoming telephone line is monitored for an incoming touch tone signal transmitted by the calling party in response to the first instruction message. In the event that a touch tone signal is received from the calling party in response to the first instruction message within a predetermined period of time from the beginning of transmission of the first instruction message, the received touch tone signal is decoded to determine the identity of a called individual to receive an incoming message signal from the calling party. In the event that a touch tone signal is not received from the calling party in response to the first instruction message within the predetermined period of time from tee beginning of transmission of the first instruction message, a second instruction message is generated on the outgoing telephone line to indicate to a party calling from a rotary dial telephone a second signaling protocol for selecting which of the plurality of individuals is to receive a message from the calling party. The incoming telephone line is then monitored for an incoming voice-frequency signal transmitted from the calling party in response to the second instruction message. Finally, at least one of a plurality of message tape units, selected in accordance with a signal transmitted by the calling party in response to the first signaling protocol or the second signaling protocol, is activated to implement the recording of an incoming message signal from the calling party on the selected message tape unit.

In accordance with another feature of the present invention, the step of generating a first instruction message includes the step of playing the first instruction message from an outgoing message tape unit. Alternatively, the first instruction message may be transmitted from a solid state memory unit. It is preferable that at least a part of the second instruction message is stored in and transmitted onto the outgoing telephone line from a solid state memory unit.

Pursuant to another feature of the present invention, the second instruction message includes electrically encoded names of the plurality of individuals, the names being separated by pauses. In this case, the step of monitoring the incoming telephone line for an incoming voice-frequency signal includes the step, performed upon a commencement of transmission of the second instruction message over the outgoing telephone line, of monitoring the incoming telephone line during the pauses in the second instruction message.

In accordance with another feature of the present invention, the second instruction message states that the calling party is to make a loud sound during a pause in the message after the name of the individual to whom the calling party wishes to communicate a message. In one particular embodiment of the present invention, the loud sound takes the form of a predetermined word, for example, the word "yes." Alternatively, the second outgoing message may simply instruct the caller from a rotary dial phone to pronounce the number corresponding to the button he would have pushed had he been calling from a touch tone telephone.

Pursuant to yet another embodiment of the present invention, a method for recording incoming message signals for one or more individuals of a plurality of individuals comprises the steps of (a) detecting a telephone call arriving over an incoming telephone line, (b) establishing a connection with the telephone line, and (c) generating an instruction message on an outgoing telephone line to indicate to a party calling from a touch tone telephone a first signaling protocol for selecting which of the plurality of individuals is to receive a message from the calling party and to indicate to a party calling from a rotary dial telephone a second signaling protocol for selecting which of the plurality of individuals is to receive a message from the calling party. In a subsequent step, the incoming telephone line is monitored for (i) an incoming touch tone signal transmitted by a calling person from a touch tone phone in response to the first instruction message and (ii) an incoming voice-frequency signal transmitted by a calling person from a rotary dial telephone in response to the second instruction message. The received signal is then decoded to determine the identity of a called individual to receive an incoming message signal from the calling person. At least one of a plurality of message tape units are selected in accordance with a signal transmitted by the calling party in response to one of the first signaling protocol and the second signaling protocol, the selected tape unit(s) being activated to record on the one of the plurality of the message tape units an incoming message signal from the calling party.

If the individuals are greater in number than the message tape units, at least one of the message tape units is allocated to exactly one of the individuals, while another message tape unit is assigned to a plurality of the individuals. Upon the reception of an incoming message for an individual assigned to the shared message tape unit, the identity (in code) of the selected individual is registered or stored in a memory unit, together with the location of the incoming message upon the recording thereof. In a specific embodiment of the present invention, additional steps include (a) erasing messages on the message tape units upon playback of the messages, (b) upon erasure of all messages from one of the message tape units assigned to a single individual, reallocating the erased message tape unit to another individual previously assigned to the shared message tape unit, and (c)

transferring messages for the reassigned individual to the erased message tape unit.

Pursuant to another feature of the present invention, a third instruction message may be generated asking the calling party to confirm the identities of the individuals for whom a message is to be recorded, in the event that the calling party designates more than one message recipient. If confirmation of multiple recipients is received, a plurality of message tape units, assigned to respective individuals, are activated.

An apparatus for recording incoming message signals for one or more individuals of a plurality of individuals comprises, in accordance with the present invention, a receiver, circuit closing components, a first outgoing message generator, a first monitoring circuit, a decoder, a second outgoing message generator, a second monitoring circuit, a plurality of tape recording units, a switching circuit and a control circuit.

The receiver is operatively connectable to an incoming telephone line for detecting a telephone call arriving over the incoming telephone line, while the circuit closing components are operatively connected to the receiver for establishing a connection with the incoming telephone line upon the arrival of an incoming call over the incoming telephone line.

The first outgoing message generator is operatively connectable to an outgoing telephone line for generating a first instruction message on the outgoing telephone line to indicate to a party calling from a touch tone telephone a first signaling protocol for selecting which of the plurality of individuals is to receive a message from the calling party. The second outgoing message generator is operatively connected to the outgoing telephone line for generating a second instruction message on the outgoing telephone line to indicate to a party calling from a rotary dial telephone a second signaling protocol for selecting which of the plurality of individuals is to receive a message from the calling party, in the event that a touch tone signal is not received from the calling party in response to the first instruction message within a predetermined period of time from the beginning of transmission of the first instruction message.

The first monitoring circuit is operatively connected to the receiver for monitoring the incoming telephone line for incoming touch tone signals, while the second monitoring circuit is operatively connected to the receiver for monitoring the incoming telephone line for incoming voice frequency signals.

The decoder is operatively connected to the first monitoring circuit for decoding a touch tone signal to determine the identity of a called individual to receive an incoming message signal from the calling party, in the event that the touch tone signal is received from the calling party in response to the first instruction message within the predetermined period of time from the beginning of transmission of the first instruction message.

The switching circuit is operatively connected to the receiver and the message tape units for connecting the receiver selectively to the message tape units, whereas the control circuit is operatively tied to the decoder, the second circuit, the switching circuit and the message tape units for selecting at least one of the message tape units in accordance with a signal transmitted by the calling party in response to one of the first signaling protocol and the second signaling protocol, for activating the selected message tape unit to record thereon an incoming message signal from the calling party, and for operating the switching circuit to connect the receiver to the selected message tape unit.

In accordance with a particular embodiment of the present invention, the first outgoing message generator includes a outgoing message tape unit and means for operatively connecting the outgoing message tape unit to the outgoing telephone line, the controller being operatively connected to the outgoing message tape unit for activating same. Alternatively, the first outgoing message generator includes a solid state memory unit. Similarly, the second outgoing message generator advantageously includes a solid state memory unit and means for operatively connecting that memory unit to the outgoing telephone line, the control circuit being operatively connected to the solid state memory unit for activating the same.

The second instruction message preferably includes the individuals' names, electrically encoded and separated by pauses and the second monitoring circuit monitors the incoming telephone line for a voice-frequency signal transmitted over the incoming telephone line during the pauses in the second instruction message.

In accordance with a particular embodiment of the present invention, for the case that the individuals are greater in number than the message tape units, a circuit component, such as the control circuit, is provided for allocating at least one of the message tape units to exactly one, chosen individual and another of the message tape units to a plurality of the individuals other than the chosen one.

Further means, such as the control circuit or microprocessor, may be provided for registering, upon the reception of an incoming message for an individual assigned to the shared message tape unit, which individual an incoming message is intended for.

A method and an associated telephone answering machine in accordance with the present invention is capable of recording messages intended for different individuals, so that an individual need not hear messages intended for other parties when listening to his or her own messages. The machine is "user friendly" and relatively cost effective. Moreover, a telephone answering machine in accordance with the present invention is responsive to instructions transmitted from a rotary dial telephone.

DETAILED DESCRIPTION

Figure 1:
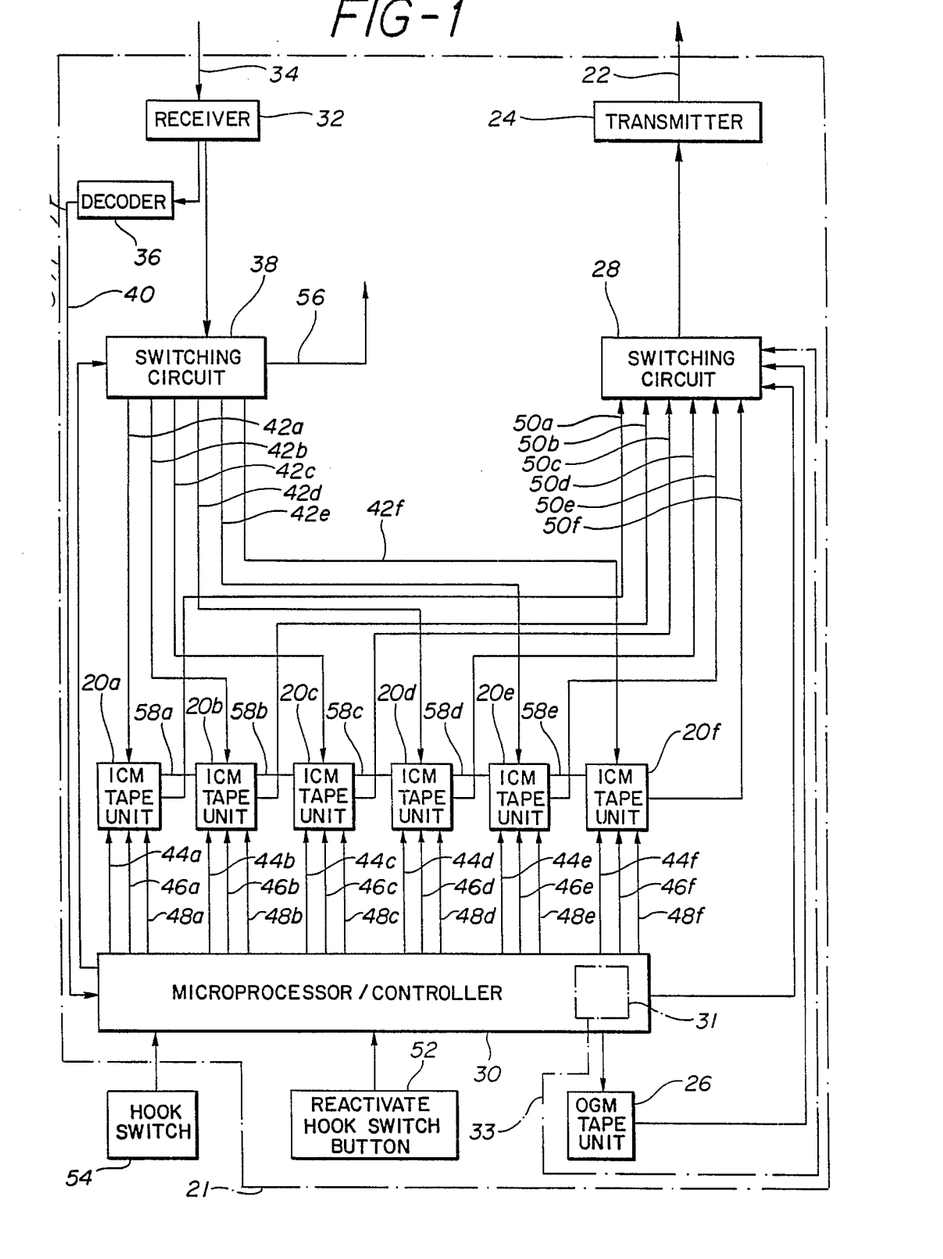
FIG. 1 is a block diagram of a telephone answering machine or message recording apparatus in accordance with the present invention.

As illustrated in FIG. 1, a telephone answering machine comprises a multiplicity of incoming message (ICM) tape units 20a, 20b, 20c, etc., all mounted in a common housing 21. Each tape unit includes a respective audio tape (not illustrated) and associated apparatus for playing, recording, erasing and rewinding the tape.

The telephone answering machine of FIG. 1 is especially designed for recording telephone messages for respective individuals of a group. If the number of individuals in the group is less than or equal to the number of ICM units 20a, 20b, 20c, etc., each ICM tape unit is assigned to a respective individual and serves to store a succession of messages for that individual only.

An outgoing message, transmitted over an outgoing telephone line 22 by a transmitter 24, is stored in an outgoing message (OGM) tape unit 26 and sent therefrom to transmitter 24 over a switching circuit 28 whose operation is under the control of a microprocessor/controller 30. The outgoing message, directed to users of touch-tone telephones, indicates a first signaling protocol, i.e., which number is to be pushed by the caller to access a desired ICM tape unit 20a, 20b, 20c, etc., for purposes of leaving a message for the individual to whom the tape unit is assigned. As described hereinfter, a second instruction message is transmitted onto outgoing tape recording units 22 via transmitter 24 and switching circuit 28 in the event that a touch tone selection signal is not received by the telephone answering machine within a predetermined period from the beginning of the first instruction message. The second instruction message is preferably stored in a solid state memory unit 31, which may be included on the same chip (not shown) as microprocessor/controller 30, and indicates to a party calling from a rotary dial telephone a second signaling protocol for selecting which of the plurality of individuals is to receive a message from the calling party. The second instruction message includes electrically encoded names of the plurality of individuals, the names being separated by pauses.

The names included in the second instruction message may be stored in memory 31 by a user or operator via a conventional series of hardware components (not illustrated), including a microphone and an analog-to-digital converter, incorporated into a telephone answering machine in accordance with the invention. The user may pronounce the names into the microphone and depress a predetermined button on the telephone answering machine, signalling the entries of the successive names.

Incoming electrical signals arriving at a receiver component 32 over an incoming telephone line 34 are relayed by the receiver component to a decoder 36 and another switching circuit 38. The decoder in turn communicates the nature of incoming signals to the microprocessor/controller via a lead 40. Upon detecting, via decoder 36, the arrival of a touch-tone signal corresponding to one of the tape unit codes, microprocessor/controller 30 transmits a signal to switching circuit 38 to induce that circuit to connect receiver component 32 to the selected ICM tape unit 20a, 20b, 20c, etc. To that end, switching circuit 38 is provided with a multiplicity of output leads 42a, 42b, 42c, etc., extending to respective ICM tape units 20a, 20b, 20c, etc. ICM tape units 20a, 20b, 20c, etc., have respective first input leads 44a, 44b, 44c, etc., extending from microprocessor/controller 30 for receiving therefrom recording control signals, respective second input leads 46a, 46b, 46c, etc., carrying playback control signals, and respective third input leads 48a, 48b, 48c, etc., for carrying other signals such as rewinding and erase signals. Upon transmitting a switching signal to switching circuit 38, microprocessor/controller 30 also transmits a recording signal to the selected ICM tape unit 20a, 20b . . . or 20f via the respective lead 42a, 42b . . . or 42f. Upon detecting, via decoder 36, a cessation of voice-carrying signals and/or a deactivation of receiver component 32, microprocessor/controller 30 causes switching circuit 38 to break the connection being receiver component 32 and the selected ICM tape unit 20a, 20b . . . or 20f and deactivates that tape unit.

Microprocessor/controller 30 thus acts, in conjunction with decoder 36, to monitor signals arriving over incoming telephone line 34 to determine whether a touch tone signal has arrived within a predetermined time interval following the commencement of the message signal transmitted from OGM tape unit 26. If such a touch tone selection has not been made within the predetermined time interval, microprocessor/controller 30 activates memory unit 31 to generate an electrical signal on a lead 33 extending to switching circuit 28. Microprocessor/controller 30 then monitors incoming telephone line 34 for a voice-frequency signal interrupting a pause after an individual's encoded name in the second instruction message (from memory unit 31). Upon detecting such a pause interruption, microprocessor/controller 30 proceeds as set forth hereinabove, i.e., transmits a signal to switching circuit 38 to induce that circuit to connect receiver component 32 to the selected ICM tape unit 20a, 20b, 20c, etc., and also transmits a recording signal to the selected ICM tape unit 20a, 20b . . . or 20f via the respective lead 42a, 42b . . . or 42f.

Figure 2:
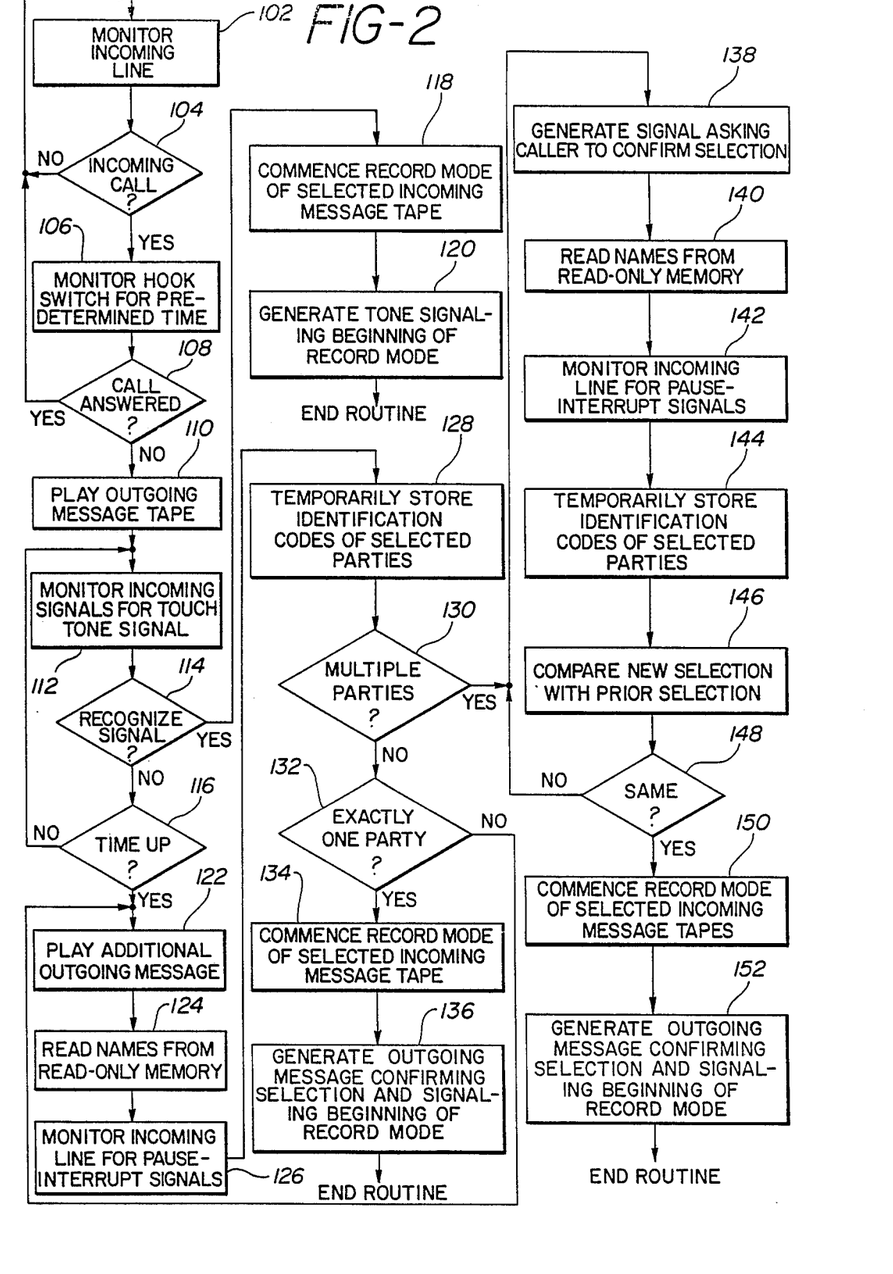
FIG. 2 is a flow chart diagram showing steps executed by a microprocessor of FIG. 1 in performing a method in accordance with the present invention.

FIG. 2 depicts a general routine executed by microprocessor/controller 30. In a first step 102, microprocessor/controller 30 monitors incoming telephone line 34 for incoming telephone calls. The monitoring step continues to be repeated at periodic intervals, as long as no call has been detected. If an incoming telephone call is detected by microprocessor/controller 30, as determined at a decision junction 104, microprocessor/controller 30 then monitors a hook switch 54 (FIG. 1) in a step 106 for a pre-established period to check whether the call has been answered. If the call is answered within that pre-established period, as determined at a decision junction 108, microprocessor/controller 30 returns to a state wherein it waits for an incoming call. Pursuant to a specific feature of the invention, if hook switch 54 is closed again within another pre-established period, the microprocessor/controller proceeds as if the hook switch were never opened.

If the telephone is not answered withing the preestablished period, as determined at decision junction 108 (or if the handset is replaced on the hook switch within that same period, or shortly thereafter), microprocessor/controller 30 operates OGM tape unit 26 in a step 110 to transmit the first instruction message over switching circuit 28 and transmitter 24, as described above. That played instruction message indicates which button or buttons on a touch tone telephone keyboard a callng party is to actuate in order to leave a message for any of a group of individuals.

In a step 112 performed upon the initiation of message transmission, microprocessor/controller 30 monitors incoming telephone line 34 for a touch tone signal. If microprocessor/controller 30 recognizes a touch tone signal within a predetermined time interval following the commencement of transmission of the message signal from OGM tape unit 26, as determined at a pair of decision junctions 114 and 116, the microprocessor/controller transmits, in a step 118, a record signal to the selected ICM tape unit 20a, 20b, 20c, etc., via a respective lead 44a, 44b, 44c, etc., and may also generate in a step 120 an outgoing tone, exemplarily via memory unit 31, for indicating that the record mode has been entered.

If microprocessor/controller 30 fails to recognize a touch tone signal within the predetermined time interval following the commencement of transmission of the instruction message signal from OGM tape unit 26, as determined at decision junctions 114 and 116, the microprocessor/controller activates memory unit 31, in a step 122, to transmit a beginning portion of the second instruction message over switching circuit 28 and transmitter 24, as set forth above. That beginning portion instructs the calling party to voice a loud sound, such as the word "yes," during the pause after the calling party hears the name of the individual with whom the calling party wishes to communicate. In a subsequent sequence of steps 124 and 126, microprocessor/controller 30 activates memory unit 31 to transmit the encoded individuals' names over the outgoing telephone line 22 and also monitors, via decoder 36, incoming telephone line 34 during the pauses interleaved with the name transmissions.

Upon detecting a voice-frequency signal during one or more pauses in the second instruction message, microprocessor/controller 30 temporarily stores an identification code or codes corresponding to the party or parties selected by means of the pause interrupting voice-frequency signal (step 128). The microprocessor/controller then inquires at 130 whether more than one party was apparently selected during transmission of the second instruction message.

If only one party was selected, i.e., if a voice-frequency signal was detected during only one pause in the second instruction message, as determined at inquiries 130 and 132, then microprocessor/controller 30 transmits, in a step 134, a record signal to the selected ICM tape unit 20a, 20b, 20c, etc., via a respective lead 44a, 44b, 44c, etc., and may also generate in a step 136 an outgoing message (as well as a record tone), exemplarily via memory unit 31, for confirming the selection detected by the microprocessor/controller.

If no party was selected, i.e., if no voice-frequency signal was detected during any of the pauses in the second instruction message, as determined at inquiries 130 and 132, then microprocessor/controller 30 executes once again steps 122 through 128. If several parties among the group of individuals using the telephone answering machine were selected, as determined at inquiry 130, then microprocessor/controller 30 generates in a step 138, preferably via memory unit 31 (FIG. 1), a signal asking the calling party to confirm the selection. In a subsequent sequence of steps 140, 142, and 144, essentially identical to steps 124, 126 and 128, respectively, microprocessor/controller 30 activates memory unit 31 to transmit the encoded individuals' names over the outgoing telephone line 22, monitors incoming telephone line 34 during the pauses between the name transmissions, and, upon detecting a voice-frequency signal during one or more pauses in the second instruction message, temporarily stores an identification code or codes corresponding to the party or parties selected by means of the pause interrupting voice-frequency signal (step 128).

In a step 146, microprocessor/controller 30 then compares the stored selection information with the previously stored selections. If the selections differ, as determined at a decision junction 148, the microprocessor/controller again performs (one time only) steps 138 through 146. If, on the contrary, the original selection of multiple parties was repeated, microprocessor/controller 30 transmits, in a step 150, a record signal to the selected ICM tape units 20a, 20b, 20c, etc., via a respective leads 44a, 44b, 44c, etc., and may also generate in a step 152 an outgoing message (as well as a record tone), via memory unit 31, for confirming the selection detected by the microprocessor/controller.

The sound to be made by a party calling from a rotary dial phone can take the form of a word or sound other than "yes" (see step 122 in FIG. 2). For example, the calling party may be instructed by the second instruction message to repeat the name of the party to be contacted, or to pronounce different numbers for different individuals to be selected. This last alternative is especially advantageous in the event that only one outgoing instruction message is transmitted. The single outgoing message indicates to a party calling from a touch tone telephone a first signaling protocol and to a party calling from a rotary dial telephone a second signaling protocol, the protocols setting forth signals to be transmitted for selecting which of the plurality of individuals is to receive a message from the calling party. During an interval following the termination of the single outgoing message, the incoming telephone line is monitored for (a) an incoming touch tone signal transmitted by a calling person from a touch tone phone in response to the first instruction message and (b) an incoming voice-frequency signal transmitted by a calling person from a rotary dial telephone in response to the second instruction message. Upon the reception of a signal, the received signal is decoded to determine the identity of a called individual to receive an incoming message signal from the calling person. The selected individual is then paired with a message tape unit, which is then activated for recording.

In accordance with a particular embodiment of the invention, microprocessor/controller 30 is programmed to enable use of the machine even if the number of participating individuals exceeds the number of ICM tape units 20a, 20b, 20c, etc. In a dynamic sharing mode of tape unit allocation, microprocessor/controller 30 assigns and reassigns ICM tape units 20a, 20b, 20c, etc., in a manner that attempts to ensure that each participating individual has a private message tape as much as possible.

In the dynamic sharing mode of tape unit allocation, the microprocessor/controller contains a memory map which stores, in encoded form, the tape unit assignments and the locations of messages on the tapes. If a resident named "X" receives a new message, microprocessor/controller 30 will store his new message on the same ICM tape unit 20a, 20b, 20c, . . . or 20f that is storing his previous messages, provided he does in fact have previous outstanding messages. If resident X has no previous outstanding messages, then microprocessor/controller 30 will assign him an ICM tape unit for storing the message he has just received. Whenever possible, the ICM tape unit 20a, 20b, 20c, . . . or 20f assigned to resident X will be an empty tape. If no empty tapes are available, the microprocessor/controller will require resident X to share an ICM tape unit with one or more other residents. Naturally, at the time when resident X picks up his pool of messages, microprocessor/controller 30 will deassign resident X his previously allocated ICM tape unit.

In certain situations, a plurality of the individuals using a telephone answering machine in accordance with the invention will not have as high a priority as other users. In that case, microprocessor/controller 30 might allocate the usage of ICM tape units 20a, 20b, 20c, etc., pursuant to a static tape sharing routine, whereby two or more individuals are permanently assigned to a common, shared ICM tape unit 20a, 20b, . . . or 20f.

For example, assuming that a telephone answering machine has three message tape units 20a, 20b and 20c only, the machine could be programmed so that the father in a family of four is assigned ICM tape unit 20a, the mother ICM tape unit 20b, and the two children ("Y" and "Z") would share ICM tape unit 20c. In this case, the telephone answering machine would list the four names of the people residing at the residence but store their messages on three tapes. Operating according to the static type tape sharing routine, microprocessor/controller 30 would remember which messages on shared tape unit 20c are for Y and which for Z. Then, if Y wished to pick up his messages, microprocessor/controller 30 would control tape unit 20c to play only the messages appropriate to him, and it would cause memory unit 31 to generate a distinct sound (such as a "beeping" sound) when tape unit 20c is traversing one of Z's messages while looking for Y's next message. If a resident, such as Y, asked for messages, then microprocessor/controller 30 would scan only the beginning portion of shared tape unit 20c containing Y's messages. Thus, if tape unit 20c has, for example, eight stored messages but Y's messages are only in positions 2 and 4, then tape unit 20c would not have to be played over all eight messages. In response to Y's request, microprocessor/controller 30 would cause the generation of a beeping sound over the first message, the playing of the second message, the generation of the beeping sound over the third message and the playing of the fourth message. Microprocessor/controller 30 would also remember which messages have been picked up from shared tape 20c and which have not. If all messages were picked up, microprocessor/controller 30 would rewind tape 20c so that the tape head is at the leftmost start position of the tape. Otherwise, after a resident such as Y picks up his messages, the tape head would be placed in the leftmost position having all the remaining messages not yet picked up lie to the left of the tape head.

In a semi-dynamic sharing routine, which may be considered a hybridization of the dynamic and static sharing tape allocation methods, some individuals of the group of individuals to be served are assigned their own private cassette tapes, while the remaining residents share a "dynamic" pool of tapes, as described hereinabove. For example, a family of five might utilize a 4-tape machine so that the parents each have their own private ICM tape, while the three children dynamically share the remaining two tapes.

In a more particular embodiment of the present invention, utilizable in the dynamic and semi-dynamic methods or protocols of tape allocation, messages can be transferred from one ICM tape unit 20a, 20b, 20c, etc., to another (via a network represented in FIG. 1 by leads 58a, 58b, etc.,). This capability is desirable because there will be occasions under those protocols where residents P and Q are initially forced to share a cassette tape and resident R subsequently picks up all her messages, rendering her tape empty. After R has vacated her tape, a telephone answering machine in accordance with the present invention would preferably move either P's or Q's messages onto R's old tape because these two message pools should ideally be kept separate. Microprocessor/controller 30 will check which resident on the shared tape has his first message appear later on this tape (P or Q), and copy all of that resident's messages onto the just-vacated tape. This copy protocol guarantees that no message is copied more than once, thereby assuring that the quality of the sound will not degrade significantly from unnecessary copying.

It is to be noted that in many applications, OGM tape unit 26 may include a 30-minute cassette, the first instruction message occupying perhaps the first two minutes of that cassette. In that case, the remainder of the cassette may be used for storing incoming messages (particularly the incoming messages of a person of lowest message priority), whereby a telephone answering machine with k ordinary ICM tapes and one OGM tape would then be substantially equivalent to a machine with k+1 ICM tapes. This adaptation could be used in combination with any of the tape allocation methods described hereinabove, that is, the dynamic, static and semi-dynamic tape allocation methods.

In order to enable a participating individual to listen to his or her recorded messages from a remote location via the telephone lines, ICM tape units 20a, 20b, 20c, etc., are provided with output leads 50a, 50b, 50c, etc., extending to switching circuit 28. Upon detecting, via decoder 36, the arrival of a tone-coded message-playback signal identifying a resident employing the telephone answering machine, microprocessor/controller 30 transmits a signal to switching circuit 28 for causing that circuit to connect the selected ICM tape unit 20a, 20b . . . or 20f to transmitter 24. Microprocessor/controller 30 also energizes a lead 46a, 46b . . . or 46f to induce the respective ICM tape unit 20a, 20b . . . or 20c to playback the messages recorded thereon.

The invention solves a problem experienced by many people who share telephone answering machines. The problem is that, in order to hear one's own messages, an individual must play back all the messages recorded on the tape. Some of those messages may be personal to other persons. In addition, telephone answering machines usually erase the entire incoming message tape upon one playback. Unless the first individual to play back the tape takes down messages by hand for other parties using the machine, the messages can be irretrievably lost. The invention accordingly enables each individual machine user to hear his or her own messages only.

In a variant of the invention, the ICM tape units 20a, 20b, 20c, etc., are modular units connectable to a basic telephone answering machine. The machine is provided with sockets for enabling the connection of additional tape units and the microprocessor/controller 30 is programmed or programmable to recognize the additional tape units.

As depicted in FIG. 1, a reactivate hook switch button 52 may be operatively connected to microprocessor/controller 30 for enabling the recording of a message on one of the ICM tape units even after a person has answered the telephone. The pushing of button 52 causes microprocessor/controller 30 to reactivate the telephone hook switch 54. Telephone answering machines on the market today do not have such a feature. Thus, the person answering the phone is compelled to take a message or the caller is obliged to call back.

Switching circuit 38 has another output lead 56 which may be connected to another answering machine (with its own bank of ICM tape units) or to an electronic control device (not shown), e.g., for turning on the heat in the house. Upon the decoding of an incoming signal, microprocessor/controller 30 operates switching circuit 38 to route subsequent incoming signals to the peripheral device.

It is to be noted that microprocessor/controller 30 is provided with means for enabling a user to change the contents of memory unit 31, as well as OGM tape unit 26, for example, for purposes of changing the second instruction message, particularly the list of names to be transmitted to calling parties. The hardware and software required for implementing this function is considered well within the skill of the art.

In a particular method, in accordance with the present invention, for recording incoming message signals for one or more individuals of a plurality of individuals, a connection is established with an incoming telephone line over which an incoming call has been detected. An instruction message is generated on an outgoing telephone line to indicate to a party calling from a touch tone telephone a signaling protocol for selecting which of the plurality of individuals is to receive a message from the calling party. The incoming telephone line is monitored for an incoming touch tone signal transmitted by the calling party in response to the instruction message. In the event that a touch tone signal is received from the calling party in response to the instruction message within a predetermined period of time from the beginning of transmission of the instruction message, the received touch tone signal is decoded to determine the identity of a called individual to receive an incoming message signal from the calling party. Then, at least one of a plurality of message tape units, selected in accordance with a signal transmitted by the calling party in response to the signaling protocol, is activated for recording an incoming message signal from the calling party. In the event that a touch tone signal is not received from the calling party in response to the instruction message within the predetermined period of time from the beginning of transmission of the instruction message, at least one preselected message tape unit is activated for recording thereon an incoming message signal from the calling party.

The preselected message tape unit may constitute an additional message tape unit. Alternatively, all of the message signal from the calling party may be recorded on all of the message tape units. In the event that some incoming messages are stored on an additional tape unit (a "buffer unit"), a request from an individual for his or her messages results in the playing of messages from that individual's personal tape (or shared tape) and messages from the buffer tape. The microprocessor/controller may be provided with a protocol for controlling the erasure of particular messages on the buffer unit in dependence on whether the particular messages have been played for all of the individual residents or subscribers who are using the telephone answering machine.

Although the invention has been described in terms of particular embodiments and applications, one of ordinary skill in the art, in light of this teaching, can generate additional embodiments and modifications without departing from the spirit of or exceeding the scope of the claimed invention. For example, the principles of this invention apply when a party is calling from a telephone set having a pushbutton type keyboard and generating rotary dial type line voltage interruption signals. Similarly, a touch tone telephone which generates touch tone signals only when transmitting a dialed number acts as a rotary dial telephone in interacting with a telephone answering machine pursuant to the invention. It is to be understood that the drawings and descriptions herein are proferred by way of example to facilitate comprehension of the invention and should not be construed to limit the scope thereof.

What is claimed is:

1. A method for recording incoming message signals for one or more individuals of a plurality of individuals, comprising the steps of:
   detecting a telephone call arriving over an incoming telephone line;
   establishing a connection with said telephone line;
   generating a first instruction message on an outgoing telephone line to indicate to a party calling from a touch tone telephone a first signaling protocol for selecting which of the plurality of individuals is to receive a message from the calling party;
   monitoring said incoming telephone line for an incoming touch tone signal transmitted by the calling party in response to said first instruction message;
   in the event that a touch tone signal is received from the calling party in response to said first instruction message within a predetermined period of time from the beginning of transmission of said first instruction message, decoding the received touch tone signal to determine the identity of a called individual to receive an incoming message signal from the calling party;
   in the event that a touch tone signal is not received from the calling party in response to said first instruction message within said predetermined period of time from the beginning of transmission of said first instruction message, generating a second instruction message on said outgoing telephone line to indicate to a party calling from a rotary dial telephone a second signaling protocol for selecting which of the plurality of individuals is to receive a message from the calling party;
   monitoring said incoming telephone line for an incoming voice-frequency signal transmitted from the calling party in response to said second instruction message;
   activating at least one of a plurality of message tape units, selected in accordance with a signal transmitted by the calling party in response to one of said first signaling protocol and said second signaling protocol, for recording on said one of said plurality of said message tape units an incoming message signal from the calling party.

2. The method set forth in claim 1 wherein said step of generating a first instruction message includes the step of playing said first instruction message from an outgoing message tape unit.

3. The method set forth in claim 1 wherein said step of generating a first instruction message includes the step of playing said first instruction message from a solid state memory unit.

4. The method set forth in claim 1 wherein said step of generating a second instruction message includes the step of reading said second instruction message at least in part from a solid state memory unit.

5. The method set forth in claim 1 wherein said step of generating a second instruction message includes the transmission, over said outgoing telephone line, of electrically encoded names of said plurality of individuals separated by pauses, said step of monitoring said incoming telephone line for an incoming voice-frequency signal including the step, performed upon a commencement of transmission of said second instruction message over said outgoing telephone line, of monitoring said incoming telephone line during said pauses in said second instruction message.

6. The method set forth in claim 5 wherein said step of generating a second instruction message includes the transmission, over said outgoing telephone line, of an instruction that the calling party is to make a loud sound during a pause in said second instruction message after the calling party hears the name of one of said plurality of individuals to whom the calling party wishes to communicate a message.

7. The method set forth in claim 6 wherein said second instruction message indicates that said loud sound shall take the form of a predetermined word.

8. The method set forth in claim 1 wherein said individuals are greater in number than said message tape units, further comprising the step of allocating at least one of said message tape units to exactly one of said individuals and another of said message tape units to a plurality of said individuals.

9. The method set forth in claim 8, further comprising the step, performed upon receiving an incoming message for an individual assigned to said other of said message tape units, of registering which individual the incoming message is for.

10. The method set forth in claim 9, further comprising the steps of (a) erasing messages on said message tape units upon playback of said messages, (b) upon erasure of all messages from one of said message tape units assigned to a single individual, reallocating the erased message tape unit to a given individual previously assigned to said other of said message tape units, and (c) transferring messages for such given individual to said erased message tape unit.

11. The method set forth in claim 1, further comprising the step, performed in the event that signals are received from the calling party indicating that a message is to be left for more than one individual, of generating a third instruction message asking the calling party to confirm the identities of the individuals for whom a message is to be recorded.

12. The method set forth in claim 11 wherein said step of activating includes the step of simultaneously activating a plurality of said message tape units each assigned to respective ones of said individuals.

13. An apparatus for recording incoming message signals for one or more individuals of a plurality of individuals, comprising:
   receiving means operatively connectable to an incoming telephone line for detecting a telephone call arriving over said incoming telephone line;
   circuit closing means operatively connected to said receiving means for establishing a connection with said incoming telephone line upon the arrival of an incoming call over said incoming telephone line;
   first outgoing message means operatively connectable to an outgoing telephone line for generating a first instruction message on said outgoing telephone line to indicate to a party calling from a touch tone telephone a first signaling protocol for selecting which of the plurality of individuals is to receive a message from the calling party;
   first monitoring means operatively connected to said receiving means for monitoring said incoming telephone line for incoming touch tone signals;
   decoding means operatively connected to said monitoring means for decoding a touch tone signal to determine the identity of a called individual to receive an incoming message signal from the calling party, in the event that the touch tone signal is received from the calling party in response to said first instruction message within a predetermined period of time from the beginning of transmission of said first instruction message;
   second outgoing message means operatively connectable to said outgoing telephone line for generating a second instruction message on said outgoing telephone line to indicate to a party calling from a rotary dial telephone a second signaling protocol for selecting which of the plurality of individuals is to receive a message from the calling party, in the event that a touch tone signal is not received from the calling party in response to said first instruction message within said predetermined period of time from the beginning of transmission of said first instruction message;
   second monitoring means operatively connected to said receiving means for monitoring said incoming telephone line for incoming voice frequency signals;
   a plurality of message tape units;
   switching means operatively connected to said receiving means and said message tape units for connecting said receiving means selectively to said message tape units; and
   control means operatively connected to said decoding means, said second monitoring means, said switching means and said message tape units for selecting at least one of said message tape units in accordance with a signal transmitted by the calling party in response to one of said first signaling protocol and said second signaling protocol, for activating said one of said message tape units to record thereon an incoming message signal from the calling party, and for operating said switching means to connect said receiving means to said one of said message tape units.

14. The apparatus set forth in claim 13 wherein said first outgoing message means includes a outgoing message tape unit and means for operatively connecting said outgoing message tape unit to said outgoing telephone line, said control means being operatively connected to said outgoing message tape unit for activating same.

15. The apparatus set forth in claim 13 wherein said first outgoing message means includes a solid state memory unit and means for operatively connecting said memory unit to said outgoing telephone line, said control means being operatively connected to said memory unit for activating same.

16. The apparatus set forth in claim 13 wherein second outgoing message means includes a solid state memory unit and means for operatively connecting said memory unit to said outgoing telephone line, said control means being operatively connected to said memory unit for activating same.

17. The apparatus set forth in claim 13 wherein said second instruction message includes electrically encoded names of said plurality of individuals separated by pauses, said second monitoring means monitoring said incoming telephone line for a voice-frequency signal transmitted over said incoming telephone line during said pauses in said second instruction message.

18. The apparatus set forth in claim 17 wherein said second instruction message includes an instruction that the calling party is to make a loud sound during a pause in said second instruction message after the calling party hears the name of one of said plurality of individuals to whom the calling party wishes to communicate a message.

19. The apparatus set forth in claim 18 wherein said second instruction message indicates that said loud sound shall take the form of a predetermined word.

20. The apparatus set forth in claim 13 wherein said individuals are greater in number than said message tape units, further comprising means for allocating at least one of said message tape units to exactly one of said individuals and another of said message tape units to a plurality of said individuals.

21. The apparatus set forth in claim 20, further comprising means for registering, upon receiving an incoming message for an individual assigned to said other of said message tape units, which individual an incoming message is intended for.

22. The apparatus set forth in claim 21, further comprising first means for erasing messages on said message tape units upon playback of said messages, second means for reallocating, upon erasure of all messages from one of said message tape units assigned to a single individual, the erased message tape unit to a given individual previously assigned to said other of said message tape units, and third means for transferring messages for such given individual to said erased message tape unit.

23. The apparatus set forth in claim 13, further comprising means for generating, in the event that signals are received from the calling party indicating that a message is to be left for more than one individual, a third instruction message asking the calling party to confirm the identities of the individuals for whom a message is to be recorded.

24. The apparatus set forth in claim 23 wherein means for activating includes means for simultaneously activating a plurality of said message tape units each assigned to respective ones of said individuals.

25. An automatic telephone answering system comprising:
   a housing;
   signal receiving means disposed in said housing and connectable to an incoming telephone line for receiving incoming telephone signals, including ringing signals, touch tone frequencies and voice-frequency signals;
   decoding means disposed in said housing and operatively connected to said signal receiving means for decoding said incoming telephone signals;
   a plurality of tape recording units disposed in said housing;
   switching means disposed in said housing and operatively tied at an input end to said receiving means and at an output side to each of said tape recording units for selectively routing incoming voice-frequency signals to said tape recording units;
   processing means disposed in said housing and operatively connected to said decoding means, to said switching means and to said tape recording units for operating said switching means to connect a selected one of said tape recording units to said receiving means and for activating said selected one of said tape recording units in response to a signal from said decoding means encoding the identity of said selected one of said tape recording units;
   signal transmitting means disposed in said housing and connectable to an outgoing telephone line for transmitting voice frequency signals over said outgoing line; and
   message storage means disposed in said housing and operatively connected to said processing means and said signal transmitting means for feeding thereto, in response to an enabling signal from said processing means, a prerecorded voice-frequency message indicating to a caller the identities of individuals and associated touch tone digits assigned to respective ones of said plurality of tape recording units.

26. The telephone answering system set forth in claim 25, further comprising means for selectively activating said plurality of tape recording units in response to voice-frequency signals.

27. The telephone answering system set forth in claim 25, further comprising a buffer tape unit operatively connected to said switching means, said processing means being operatively connected to said buffer tape unit for activating same to store incoming messages upon failure of said processing means to detect a tape identifying signal within a predetermined period following a transmission of said prerecorded voice-frequency message over said outgoing line.

28. A method for recording incoming message signals for one or more individuals of a plurality of individuals, comprising the steps of:
   detecting a telephone call arriving over an incoming telephone line;
   establishing a connection with said telephone line;
   generating an instruction message on an outgoing telephone line to indicate to a party calling from a touch tone telephone a signaling protocol for selecting which of the plurality of individuals is to receive a message from the calling party;
   monitoring said incoming telephone line for an incoming touch tone signal transmitted by the calling party in response to said instruction message;
   in the event that a touch tone signal is received from the calling party in response to said instruction message within a predetermined period of time from the beginning of transmission of said instruction message, decoding the received touch tone signal to determine the identity of a called individual to receive an incoming message signal from the calling party;
   activating at least one of a plurality of message tape units, selected in accordance with a signal transmitted by the calling party in response to said signaling protocol, for recording on said one of said plurality of said message tape units an incoming message signal from the calling party;
   in the event that a touch tone signal is not received from the calling party in response to said instruction message within said predetermined period of time from the beginning of transmission of said instruction message, activating at least one preselected message tape unit for recording thereon an incoming message signal from the calling party.

29. The method set forth in claim 28 wherein said preselected message tape unit constitutes an additional message tape unit.

30. The method set forth in claim 29, further comprising the step of playing back messages from one of said message tape units and from said additional tape unit in response to a request from one of said plurality of individuals.

31. The method set forth in claim 28 wherein said step of activating at least one preselected message tape unit constitutes the step of activating each of said plurality of said message tape units for recording on each active one of said plurality of said message tape units the incoming message signal from the calling party.

32. A method for recording incoming message signals for one or more individuals of a plurality of individuals, comprising the steps of:

- detecting a telephone call arriving over an incoming telephone line;
- establishing a connection with said telephone line;
- generating an instruction message on an outgoing telephone line to indicate to a party calling from a rotary dial telephone a signaling protocol for selecting which of the plurality of individuals is to receive a message from the calling party, said instruction message including the transmission, over said outgoing telephone line, of electrically encoded names of said plurality of individuals separated by pauses;
- monitoring said incoming telephone line for an incoming pause interruption signal transmitted from the calling party in response to said instruction message; and
- activating at least one of a plurality of message tape units, selected in accordance with a signal transmitted by the calling party in response to said signaling protocol, for recording on said one of said plurality of said message tape units an incoming message signal from the calling party.

33. The method set forth in claim 32 wherein said step of generating a instruction message includes the step of playing said instruction message from a solid state memory unit.

34. A method for recording incoming message signals for one or more individuals of a plurality of individuals, comprising the steps of:

- detecting a telephone call arriving over an incoming telephone line;
- establishing a connection with said telephone line;
- generating an instruction message on an outgoing telephone line to indicate to a party calling from a touch tone telephone a first signaling protocol for selecting which of the plurality of individuals is to receive a message from the calling party and to indicate to a party calling from a rotary dial telephone a second signaling protocol for selecting which of the plurality of individuals is to receive a message from the calling party;
- monitoring said incoming telephone line for (a) an incoming touch tone signal transmitted by a calling person from a touch tone phone in response to said first signaling protocol and (b) an incoming voice-frequency signal transmitted by a calling person from a rotary dial telephone in response to said second signaling protocol;
- decoding the received signal to determine the identity of a called individual to receive an incoming message signal from the calling person; and
- activating at least one of a plurality of message tape units, selected in accordance with a signal transmitted by the calling party in response to one of said first signaling protocol and said second signaling protocol, for recording on said one of said plurality of said message tape units an incoming message signal from the calling party.

* * * * *